C. W. FERGUSON.
COOP.
APPLICATION FILED JULY 9, 1914.

1,135,886.

Patented Apr. 13, 1915.
2 SHEETS—SHEET 1.

WITNESSES:

INVENTOR
Charles W. Ferguson
BY
Hardway & Cathy
ATTORNEYS.

C. W. FERGUSON.
COOP.
APPLICATION FILED JULY 9, 1914.

1,135,886.

Patented Apr. 13, 1915.
2 SHEETS—SHEET 2.

WITNESSES:
Baylor Hill
J. E. Carpenter

INVENTOR
Charles W. Ferguson,
BY
Hardway & Cathey
ATTORNEYS.

UNITED STATES PATENT OFFICE.

CHARLES W. FERGUSON, OF HOUSTON, TEXAS.

COOP.

1,135,886.     Specification of Letters Patent.     Patented Apr. 13, 1915.

Application filed July 9, 1914. Serial No. 849,944.

*To all whom it may concern:*

Be it known that I, CHARLES W. FERGUSON, a citizen of the United States, residing at Houston, in the county of Harris and State of Texas, have invented certain new and useful Improvements in Coops, of which the following is a specification.

This invention relates to a new and useful improvement in coops, and has more particular relation to such devices as are particularly adapted to be used for the purpose of shipping poultry and the like.

The object of the invention is to provide a device of the character described wherein poultry, and the like, may be confined while being shipped, and which is provided with slidable slats or bars, forming part of each end which may be locked in a fixed position, but which are also capable of being released from said locking means and moved vertically thus leaving a wide space in each end through which the confined fowls may have access to food and water, placed on the outside of the coop. It is always desirable, and in many cases by law required, that poultry being shipped be fed and watered, and if the food and water are placed within the coop they will be wasted by the fowl and the coop will soon become filled with refuse resulting in an unhealthful condition thereof. It is consequently preferable that the food and water be placed without the coop, and provision made so that the poultry may gain access thereto, and for this purpose the device herein described has been provided.

With the above and other objects in view, the invention has particular relation to certain novel features of construction, operation and arrangement of parts, an example of which is given in this specification and illustrated in the accompanying drawings, wherein:—

Figure 1:
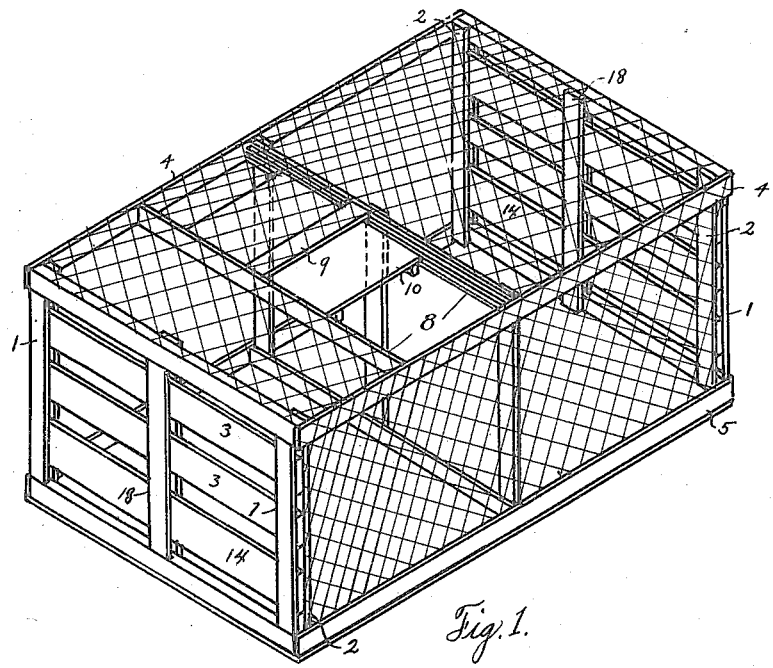
Figure 3:
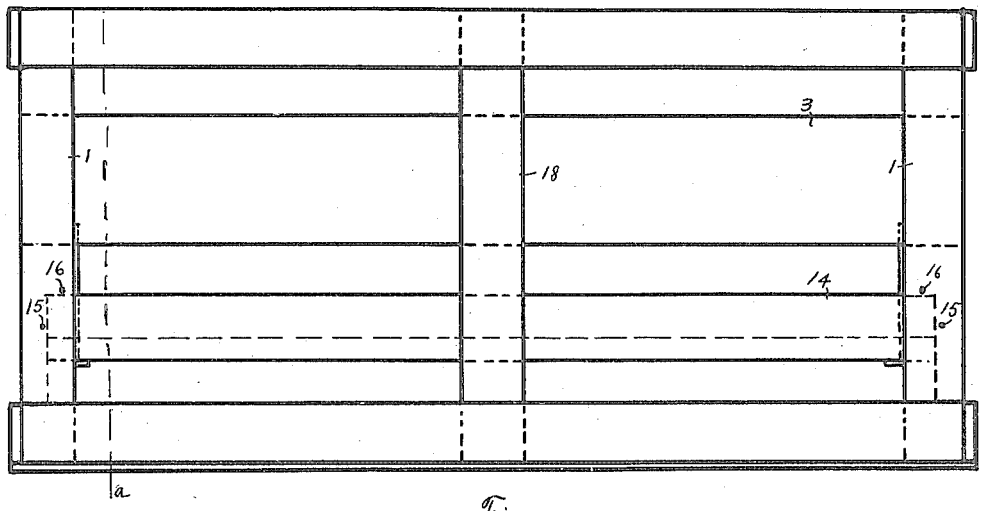
Figure 5:
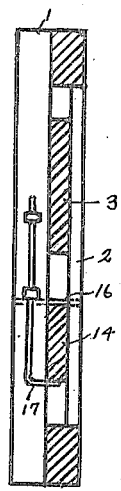
Figure 6:
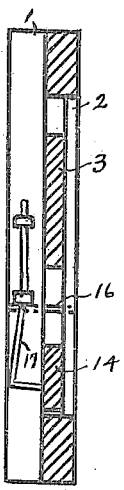
Figure 2:
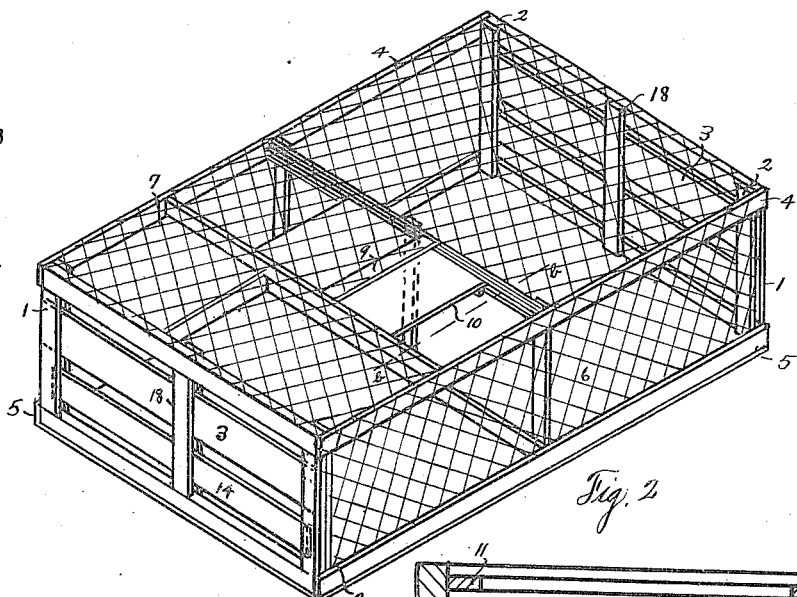
Figure 7:
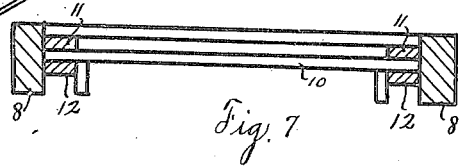
Figure 4:
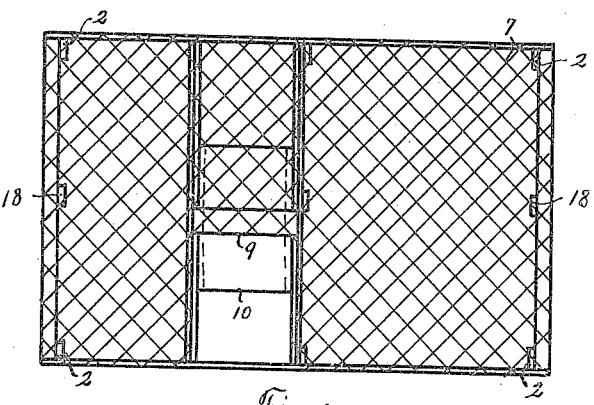

Figure 1 is a perspective view of one form of the coop designed to receive large fowls.
Fig. 2 is a perspective view of another form of the coop intended for small fowls. Fig. 3 shows an end view of the frame-work. Fig. 4 shows a plan view of the coop. Fig. 5 shows a sectional view taken on the line *a—a* of Fig. 3, and showing the vertically slidable bar or slat locked in a fixed position. Fig. 6 shows a sectional view of the end frame work taken on the line *a—a* of Fig. 3, and showing the vertically slidable bar in its lowered position, and Fig. 7 shows a sectional view of the means for supporting the sliding door.

Referring now more particularly to the drawings wherein like numerals of reference designate similar parts in each of the figures, the numerals 1, 1, 1, 1 refer to the corner posts of the frame work of the device, and the numerals 2, 2, 2, 2 designate binders which are secured upon the inner sides of the respective corner posts, the ends of the cross slats 3, 3, forming the ends of the frame work, however, being secured between the respective corner posts 1, 1, 1, 1 and binders 2, 2, 2, 2, said binders thus being spaced a distance from said corner posts. The sides of the frame work are formed of the top and bottom side members 4 and 5, which are secured to the upper and lower ends respectively of the corner posts. A suitable bottom 6 is provided, which is preferably formed of light board or some other light material, and the top and sides of the coop are formed of wire mesh the edges of which are secured under the side members 5 said mesh being drawn tightly over the top side members 4, thus securely holding the top side members in position and being protected by the bottom side members 5.

Two transverse supports 8, 8 are provided, whose ends are secured to the upper side members 4, said supports being spaced a suitable distance apart, and being braced by the cross-bar 9, arranged at one side of the middle point of said supports. In case the coop is intended for large fowls the mesh work will be cut away between the supports 8, 8 on the side of the cross-bar 9 giving the most space as shown in Fig. 1, and in case the coop is to be used for small fowls the mesh work will be cut away on the side of the cross-bar 9 giving the least space, as shown in Fig. 2, in either case giving a door way for the admission of fowl to the coop, said door way being controlled by the door 10. The inner side of each of the supports 8, 8 has lengthwise extending ribs 11, 11, and 12, 12, secured thereto and spaced apart forming opposing grooves in which the respective edges of the door 10 slide, so that the door may be moved back and forth in said grooves and open and close said door way.

Each end of the coop is provided with a vertically movable bar or slat 14, as more clearly shown in Fig. 3. The ends of this slat project in between the adjacent corner posts 1 and binders 2 and are movable up and down therebetween. The ends of said slat 14 fall short of the outer edges of the corner posts as shown in Fig. 3 and suitable nails as 15, 15, are driven through the corner posts and binders opposite the ends of the slats 14 so as to prevent the lengthwise movement of said slats, and likewise suitable nails 16, 16, are driven through said corner posts 1 and binders 2 immediately above the respective ends of the slats 14 so as to limit their upward movement. The inner side of each of the corner posts 1 is provided with a flexible hook secured at its upper end to its corner post, and the lower end of which is provided to engage under the slat 14 and hold the same in its elevated position and against the nails 16, in which position said slat 14 will be equally spaced from the slats above and beneath. In case it is desired to feed or water the fowls in the coop the hooks 17 may be withdrawn from under the slat 14 and said slat forced downwardly to the position shown in Fig. 6, thus leaving a wide space above the slat 14 through which the fowls may gain access to the food and water. The ends of the coop may be strengthened by means of the vertical braces 18, 18, if desired, but these are not indispensable.

What I claim is:—

In a housing device for animals, suitable corner posts and cross slats forming the side walls thereof, one of the cross slats of one wall being vertically movable, stops carried by the corresponding corner posts against which the respective ends of the movable slat engage for restricting its movement in one direction and flexible hooks secured to the inner sides of said corner posts and engaging with said movable slat and holding it against said stops, said hooks being capable of disengagement from said slat so as to permit its vertical movement.

In testimony whereof I have signed my name to this specification in the presence of two subscribing witnesses.

CHARLES W. FERGUSON.

Witnesses:
F. J. TAYLOR,
ELIZABETH CONNOLLY.

Copies of this patent may be obtained for five cents each, by addressing the "Commissioner of Patents, Washington, D. C."